United States Patent [19]

Wieber et al.

[11] Patent Number: 5,261,193
[45] Date of Patent: Nov. 16, 1993

[54] TENSIONED MEMBRANE CLADDING SYSTEM

[75] Inventors: Robert F. Wieber, Glenwood; David P. Capezzuto, West Seneca; John D. Hayes, Sanborn, all of N.Y.

[73] Assignee: Birdair, Inc., Amherst, N.Y.

[21] Appl. No.: 841,714

[22] Filed: Feb. 26, 1992

[51] Int. Cl.$^5$ .......................... E04B 1/12; E04G 11/04
[52] U.S. Cl. ........................................... 52/63; 52/222; 52/248
[58] Field of Search .................. 52/63, 222, 248, 249, 52/407

[56] References Cited

U.S. PATENT DOCUMENTS

| | | | |
|---|---|---|---|
| 3,199,258 | 8/1965 | Jentoft et al. | 52/222 |
| 3,398,491 | 8/1968 | Babcock | 52/222 |
| 3,546,831 | 12/1970 | Romo et al. | |
| 3,826,270 | 7/1974 | Hentges. | |
| 3,872,634 | 3/1975 | Seaman | 52/222 |
| 4,036,244 | 7/1977 | Huddle. | |
| 4,136,408 | 1/1979 | Dahlbeck et al. | |
| 4,137,687 | 2/1979 | Sprung. | |
| 4,184,294 | 1/1980 | Purvis | 52/2 |
| 4,214,407 | 7/1980 | Charter | 52/63 |
| 4,398,376 | 8/1983 | Fraioli. | |
| 4,424,650 | 1/1984 | Van Note | 52/63 |
| 4,583,331 | 4/1986 | Hunt. | |
| 4,593,710 | 6/1986 | Stafford et al. | |
| 4,642,962 | 2/1987 | Walter. | |
| 4,733,507 | 3/1988 | Doublet. | |
| 4,739,592 | 4/1988 | del Pilar. | |
| 4,773,191 | 9/1988 | Slack. | |
| 4,835,917 | 6/1989 | Simpson. | |
| 4,901,484 | 2/1990 | Santosuosso. | |

Primary Examiner—Carl D. Friedman
Assistant Examiner—Christopher T. Kent
Attorney, Agent, or Firm—Howard J. Greenwald

[57] ABSTRACT

The present invention is system for covering structures that have complex surfaces using tensioned membrane panels which exhibit maximum flexibility over multiple curvatures of the structure's surface. The system includes a means for supporting the cladding membrane over the structure, a means for tensioning the cladding membrane and a means for securing the tensioned cladding membrane to the structure. Generally, ribs are mounted to the structure wherein the ribs provide support for the cladding membrane. Attached at least one of the ribs are clamping channels which secure the tensioned cladding membrane to the structure. The ribs can be thermally isolated from the building surface to minimize directly conducted heat loss. Additionally, the tensioned membrane cladding system usefully accommodates various methods of applied insulation between the cladding membrane and the structure.

9 Claims, 5 Drawing Sheets

TENSIONED MEMBRANE CLADDING SYSTEM

FIELD OF INVENTION

The system of this invention is placed within the field of building siding and covering systems, such as clapboard or aluminum sidings, particularly as such siding systems relate to building structures with singly and multiply-curved surfaces.

BACKGROUND OF THE INVENTION

Structures of all kinds require that their surfaces be protected from the environmental elements to which they are exposed. Various systems for covering structures have been devised and placed in common usage, such as, siding of aluminum or of other conformable material. Typically, the covering materials must be sealed at their boundaries in order to prevent entry of water or other gases or liquids, and often must either provide insulation directly or accommodate placement of insulating materials beneath the coverings. Additional considerations which must be addressed in the design of a covering system of a particular material include aesthetic appearances, durability and longevity, and efficiency of construction and application.

The shape of a structure may either accommodate the application of particular covering systems or it may present difficulties because of the particular shape and dimensions of the structure. For example, large structures and those of a shape which departs from the rectilinear are much more difficult to cover effectively. Many of the materials and systems used in the past, are inadequate and quite ineffective to cover these types of structures.

As an alternative to the more rigid covering materials, fabric offers a much greater flexibility and adaptability to singly- and multiply-curved surfaces. However this same flexibility raises the difficult problems of erection, fastening, sealing and abrasive wear. With the development of modern reinforced fabrics, use of fabrics, such as these, as building materials for roofing and cladding has become more practical. The invention described herein, seeks to maximize the potential of fabric material as cladding for complex surface structures. The present invention embodies a system which uses a membrane, tensioned over structural supports, to cover and to weather seal large structures and unusually shaped structures, in novel and efficient ways.

Thus it is an objective of the within invention to define a system that will practically and efficiently cover a structure and enable practical use of tensioned membranes, such as fabrics, as a flexible covering material for complex structural topographies.

Another objective of this invention is to provide a secure method to retain and support the cladding over the structure surface.

Still another objective of the invention is to instruct the trades in the techniques of erecting and securing fabric panels to a building surface and in the technique of sealing the fabric panel seams and joints securely thereby protecting the structure from the elements.

Yet still another objective of the invention is to provide a clamping system that, with minimal destructive abrasive wear on the fabric, will support and secure the fabric panels against penetration by the elements.

A final objective of the invention is to devise a system which retains the tensioned fabric panels through the use of edge attachments in a vertical plane and at upper and lower boundaries of the cladding system.

These and other objectives of the invention are fully met by the invention in the application of the preferred embodiment described below.

DETAILED DESCRIPTION OF THE PREFERRED EMBODIMENT

Figure 1:
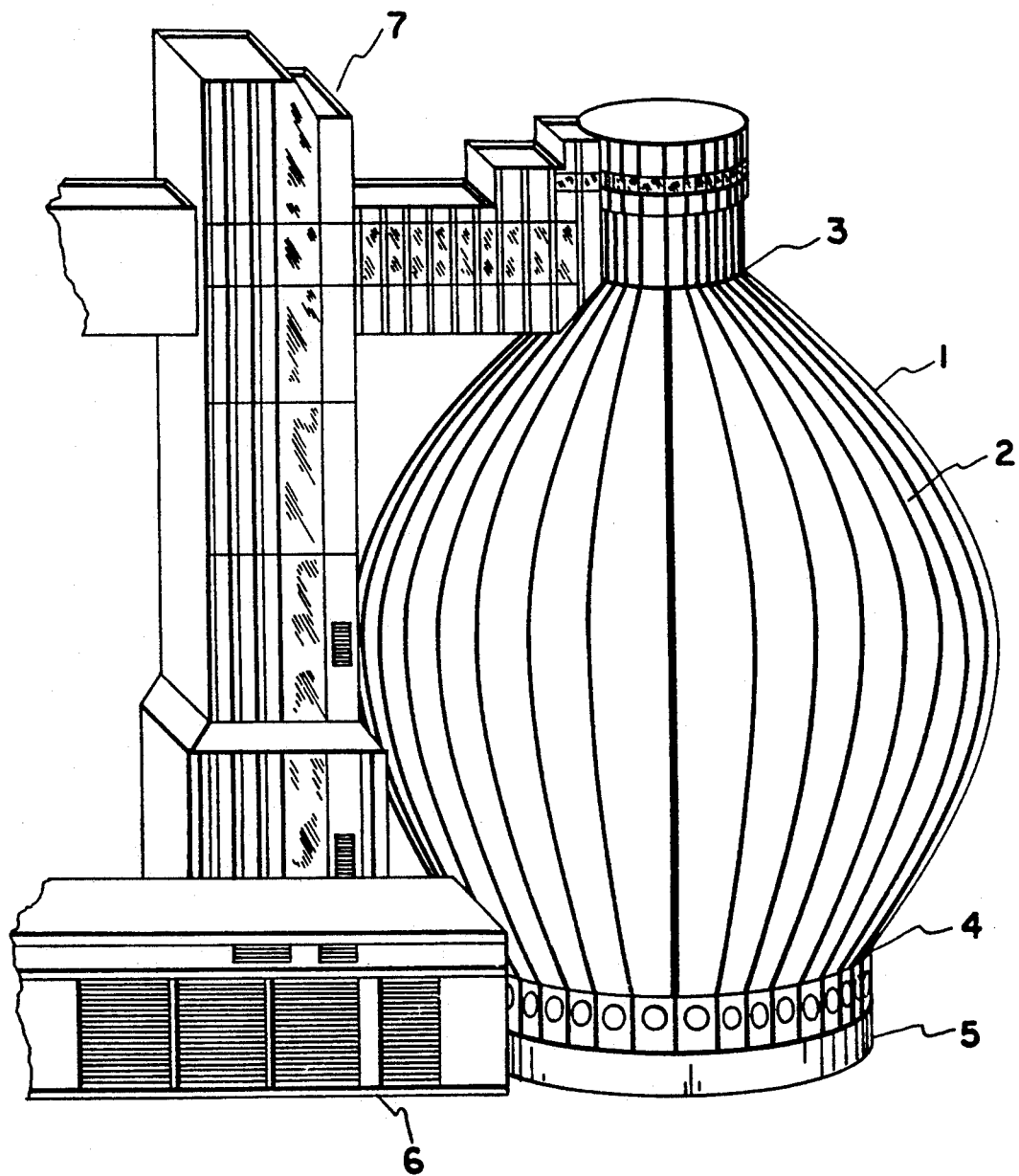
FIG. 1 is an orthogonal projection depicting the cladding system installed on a multi-curved structure.

Turning now to FIG. 1 of the appended drawings, tank 1, a large structure with a multiply curved surface is illustrated. The particular embodiment illustrated here is a tank-type structure. Existing structures which fit this description include, but are not limited to, structures used for storage or processing of organic materials. Structures such as these have a high vertical orientation and require a surface topography suited to the processes and equipment for which the interior of the tank is designed. Moreover, because such large and odd-shaped structures may be located in proximity to residential or scenic landscapes, it is preferable that they be clad to present a pleasing, or at least not an unsightly, appearance to the public.

It can be seen from FIG. 1, that the vertically and circumferentially curved surface of tank I will be difficult to cover efficiently and aesthetically with traditional rigid or overlapping building materials, such as siding or panels. This is especially true due to the fact that siding must typically be applied in a horizontal fashion in order to provide a shingled surface for water runoff. In the embodiment here, membrane 2, having a vertically ribbed surface that follows all the curvatures of the tank, provides a much improved flexible system of covering the structure of the tank. It is preferable that the cladding membrane be a flouropolymer or flouroelastomer coated fiberglass fabric, such as "TEFLON." It is also preferable that the cladding membrane be a thin membrane which creates a weather barrier, a concept which encompasses a variety of fabrics and materials; such as, Reinforced PVC, Silicone or Rubber coated membranes, and myriad other synthetic or natural materials. As a result, preferred membranes for cladding include, but are not limited to, materials such as woven or nonwoven, or reinforced or unreinforced, fabric, film, and laminate.

In the structure illustrated in FIG. I, it can be seen that the fabric, membrane 2, presents a ribbed vertical appearance terminating in top closure collar 3 and bottom closure collar 4 adjoining structural base 5. Service building 6 and accessory or gantry building structure 7 are shown here to illustrate the context of this particular clad structure. Although structural features vary from one structure to the next, this invention is adaptable to cover a variety of structures and is not limited to the embodiment of FIG. 1.

Figure 2:
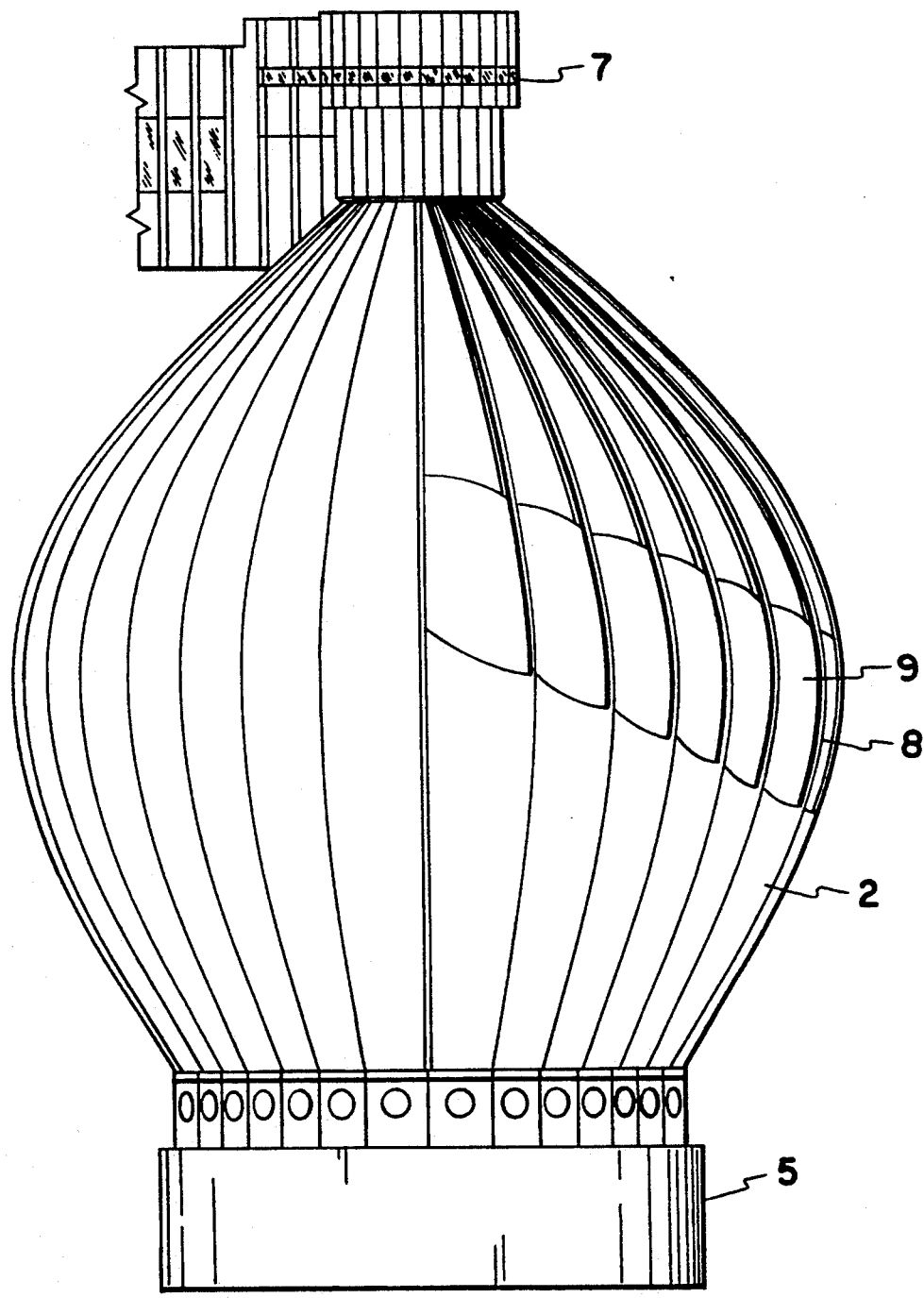
FIG. 2 is a vertical elevation view of the cladding system on structure with cutaways showing hidden layers.

FIG. 2 shows in further detail the cladding of membrane 2 over the curved structure, tank 1. The tank as shown here is supported by base 5 and is in contact with a portion of access structure 7. The cutaway portion of FIG. 2 reveals a series of means for supporting the membrane 8 which are placed in a vertical orientation around the circumference of the curved tank and welded or otherwise fastened to the tank surface. In this preferred embodiment these means for supporting the membrane are ribs. Insulation 9 may be placed and retained between the ribs.

Figure 3:
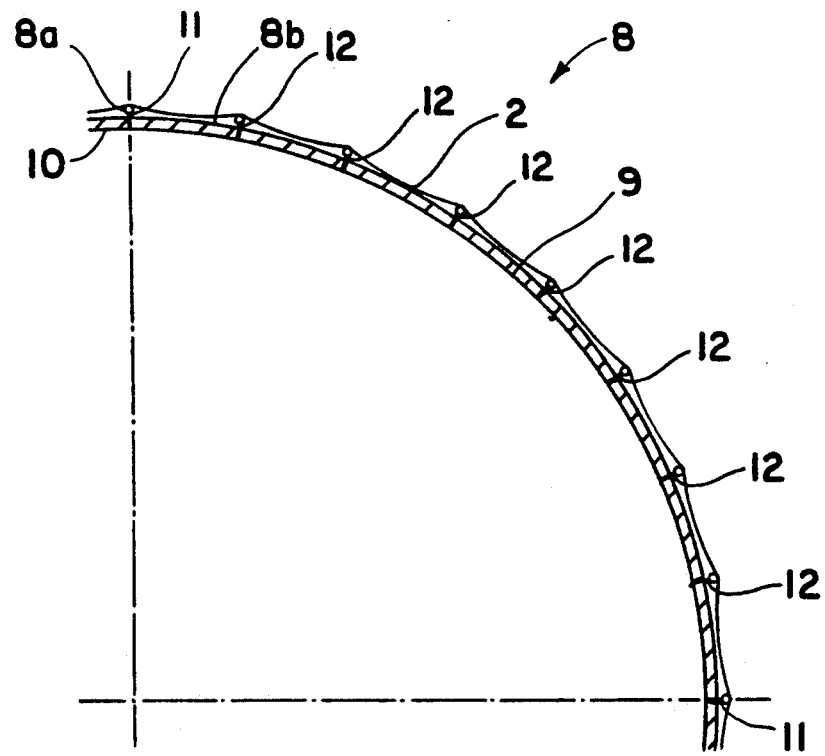
FIG. 3 is a section along line 2—2 of FIG. 2, showing the relationship of the cladding system components to the curved surface of the structure.

FIG. 3 is a quarter section resulting from a horizontal cut through a mid-portion of the tank. This figure shows tank surface 10 and the arrangement of a plurality of means for supporting the membrane 8, insulation 9 and membrane 2 over the tank surface. First means for supporting the membrane 8a is located at a first point on the tank surface and second means for supporting the membrane 8b is located at a second point on the tank surface. The preferred means for supporting the membrane are ribs, in particular, the two preferred rib types are clamping ribs 11, which are topped by a clamping rib assembly (shown in FIG. 6) and standoff ribs 12, which are located at intermediate points between clamping ribs in order to support the membrane panel spans.

While this vertical rib orientation (shown in FIG. 1) is the preferred means for supporting the membrane and while the clamping assembly (shown in FIG. 6) is the preferred means for edge attachment, this invention is adaptable to other alternative support and attachment systems. For example, instead of metal ribs, other means for supporting and stressing the membrane include but are not limited to air filled tubes, pressurizing systems and vacuum systems. The application of these systems in the invention described herein would be known to one of ordinary skill in the art based on the disclosure of the invention herein.

Figure 4:
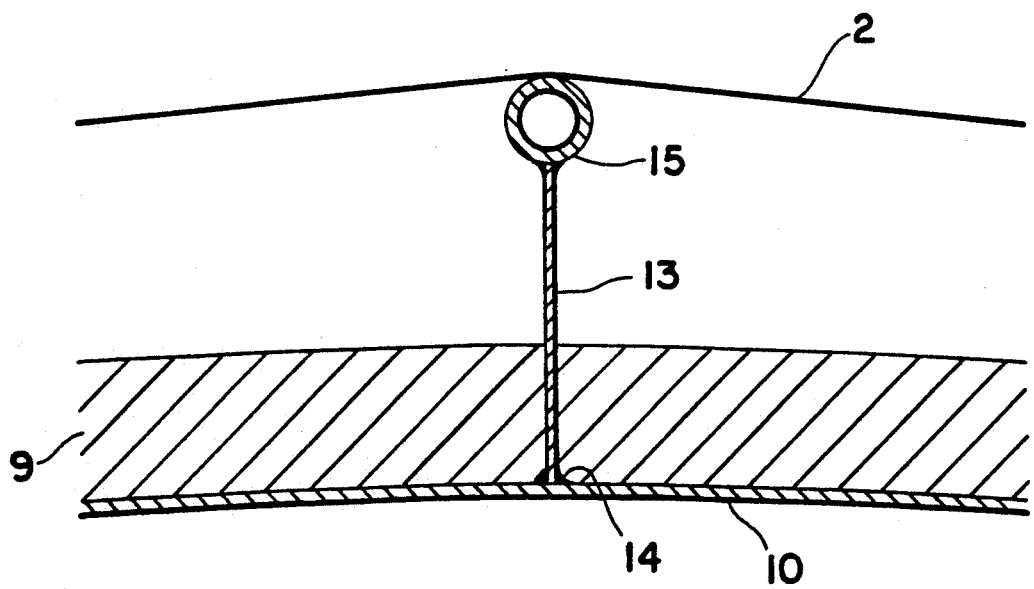
FIG. 4 is a detail of a standoff rib in cross section.
Figure 5:
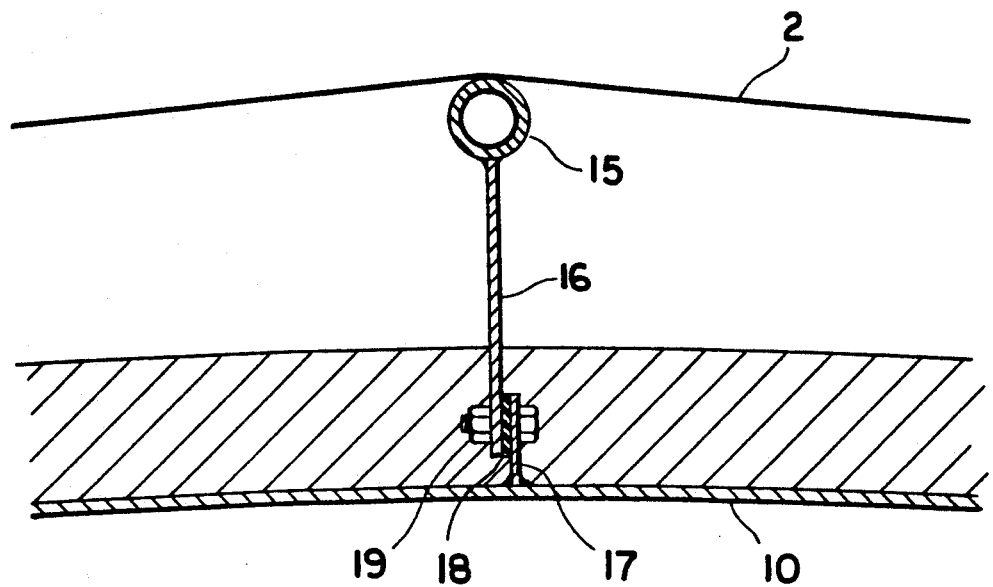
FIG. 5 is a detail of an alternative standoff rib in cross section with an insulating spacer strip.
Figure 6:
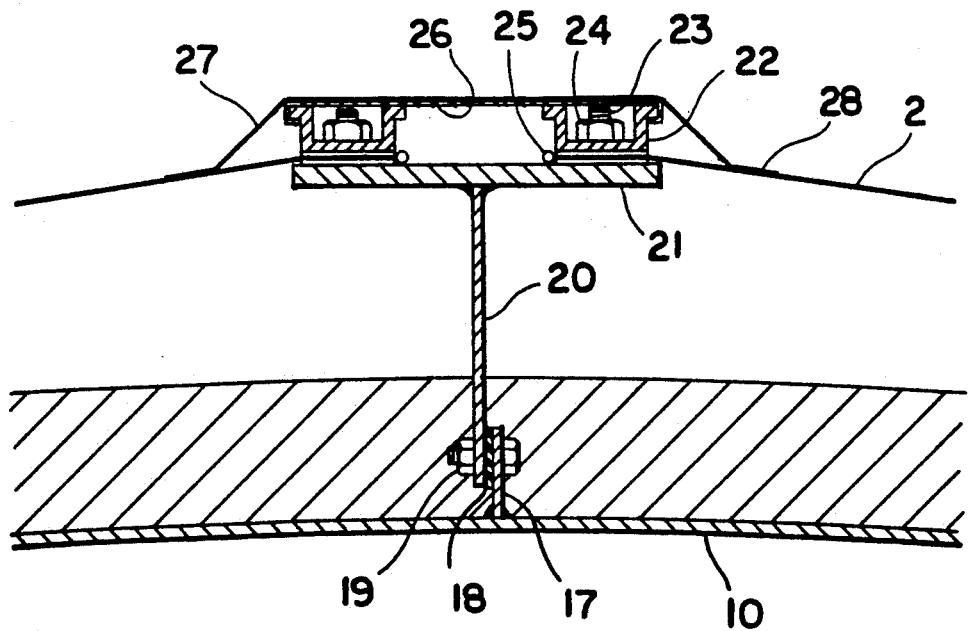
FIG. 6 is a detail of a clamping rib assembly in cross section.

Cladding membrane 2 is shown in FIG. 3 as a continuous span because the scale is too large to show details of the discrete membrane panels and the joining methods of the panels to the ribs (shown if FIGS. 4–6). However, in practice, panels of membrane are designed and fabricated to span across a predesignated number of ribs. The number of ribs spanned depends upon the geometry of the structure and the applied loads. Standard engineering calculations and finite element analysis, may be used to establish the geometry of the structure and associated radius of curvature. Basic engineering principals can be used to determine the tension on the membrane due to the various stresses and strains inherent in the system. The spacing between the ribs and the depth of each rib required in order to support the membrane so that it can accommodate the various applied loads, can also be readily determined from the principals of engineering.

As a result of the calculations the ribs will be spaced at a defined preferred placement distance. Generally, the panels are cut and shaped to span a spanning area of preferably 2 or more ribs. In the preferred embodiment where both clamping and stand-off ribs are used, the clamping and standoff ribs are placed such that some multiple of standoff ribs are placed between two clamping ribs. Accordingly, the design of the system for any particular structure will involve calculation of the rib depth, rib spacing and placement required to support the membrane panels in an appropriately radiused configuration under specific loads.

FIG. 3 of this clad embodiment shows that while the membrane is tensioned across each placement distance, i.e., between each rib, an arc with a concave curvature has formed in the span. The concave curvature is another factor in the design and the appropriate radius of the arc must be calculated in order to assure that the appropriate amount of space will exist between the tank's surface and the membrane, despite the effect of snow loads and wind suction. This airspace is necessary so that despite applied loads, the membrane will not come in contact with the surface of the tank, which could abrade the membrane and provide a path for direct heat loss from the interior.

The fact that the membrane will be completely supported is assured by the calculation of a minimum stand-off depth. The minimum stand-off depth is a measurement which takes into consideration the geometry of the surface being clad and the tension in the membrane in the horizontal and vertical directions, which includes all deflections resulting from applied loads. Deflections due to windsuction and snow loads are also accommodated. This calculation ensures that the appropriate airspace will exist between the surface of the tank and the arc of the cladding membrane. When insulation 9 is placed on the tank surface, the stand-off depth and the radius of the arc must be calculated factoring in this additional layer.

FIG. 4 further illustrates a cross-section of a standoff rib assembly consisting of a web 13 and weld 14 which attaches the rib to tank surface 10. The weld is a preferred means for mounting the rib. Tubular cap 15, welded to the distal edge of the web, is shown here as the preferred stand-off surface. In order to minimize abrasion, the stand-off surface of the outer reach of the rib is a non-abrasive surface, preferably a curved surface, such as a pipe or tubular cap 15. Insulation 9 may be added to any depth up to the height of the web, if indicated by the process and the calculations.

FIG. 5 shows an alternate embodiment of the standoff rib. This embodiment includes an isolating two-part construction. Here, web 16 is not directly welded to the tank surface 10, but is attached to rib foot 17 which is welded to the tank surface. The two rib elements are periodically connected along the length of the rib by nut-and-bolt assembly 19 and separated for thermal isolation by insulating spacer strip 18.

FIG. 6 illustrates in cross-section the preferred construction of clamping rib assembly 20. The clamping rib assembly is the preferred means for securing the cladding and means for edge attachment. The distal edge of the rib is capped with clamping plate 21 to which is fastened two clamping channels 22 which run the vertical length of the rib along the height of the structure, and fastened at intervals along the height through drilled holes by studs 23, which are affixed to the plate and tightened down by nuts 24. This arrangement provides a long continuous clamping surface into which continuous edges of the membrane panels are encapsulated and secured. In the preferred embodiment neoprene gaskets are mounted to the clamping channels in order to improve continuity of the clamping force.

The area near the panel edges must be drilled or punched at intervals to enable placement over the clamping plate studs 23. As a result, each panel edge is terminated in a lapped seam containing roped edge 25, which is typically a cord or rope section placed into the lap which is then secured in the factory operation by a heat sealing process. The roped edge provides a gripping surface for stretching the membrane panels into place across a spanning area and for securing the panel in the clamped condition.

The membrane panels are stretched in the field by means of leveraged tensioning devices, the preferred means for tensioning the section of cladding membrane, or pressure differential devices. In practice, tension on the panels is calculated and generated to precisely balance forces around the circumference of the structure by cutting the panels to slightly smaller dimensions than the placement distance. The stretch compensation factor is calculated as a percentage of any given panel dimension. For a "TEFLON" membrane the stretch compensation factor is on the order of single-digit percentages, and is preferably of a value of approximately one-half percent to about four percent. Calculation of the stretch compensation factor relies on taking into account the biaxial elongation and the inherent stretch and resistance of the membrane in order to bring the panels to the desired prestress. Thus membrane panels are cut to a size whose area is equal to that of the spanning area, reduced by a stretch compensation factor. The computations will vary with the requirements of the structure to be clad if pneumatic variations and other systems are used.

While the clamping configuration may be achieved in various ways, the preferred embodiment is shown in FIG. 6. In addition, FIG. 6 shows that the entire assembly can and must be further sealed from the outside elements. Semi-rigid cap channel 26 may be configured conveniently to span and snap over the outer edges of the clamping channels, as shown. Fabric closure strip 27 is placed over the clamping rib, vertically along the entire length, and is secured over the length of the clamping rib by heat sealing it to the membrane at mating surface 28.

The clamping rib may be welded directly to tank surface 10. However, the embodiment of the clamping rib, as shown in FIG. 6, shows the clamping rib attached to rib foot 17 which in turn is welded to the tank surface. Here, rib foot 17 is welded to tank surface 10 and periodically connected along the length of the clamping rib by nut-and-bolt assembly 19. In addition, the clamping rib and the rib foot are separated for thermal isolation by insulating spacer strip 18.

Figure 7:
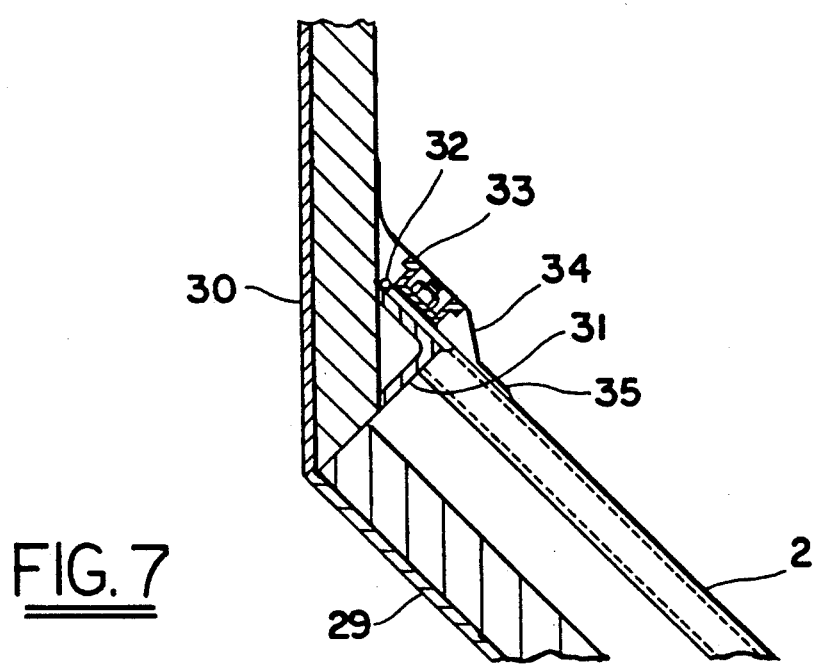
FIG. 7 is a detail in cross section of the top closure clamp.

At the tops and bottoms of the cladding membrane thus placed around the circumference of the structure, similar clamping systems are provided in ring fashion. FIG. 7 shows in cross section the upward curvature of tank wall 29 at its interface with the vertical side of tank cap 30. Supported around the tank collar in proximity of the interface of the surfaces is angle collar bracket 31 which supports a spaced series of studs which in turn fasten down clamping channel 33. The upper edge of the membrane panels terminate in roped edge 32 that is stretched and clamped by clamping channel 33 in similar fashion to that described in the vertical applications preceding. Weather cover 34 is heat sealed to the membrane body at surface 35, also in similar fashion to the vertical seams. Support for the angle bracket is not fully shown, but will be understood by those versed in metal construction techniques to employ standard methods of welding or like securing means to the body of the structure.

Figure 8:
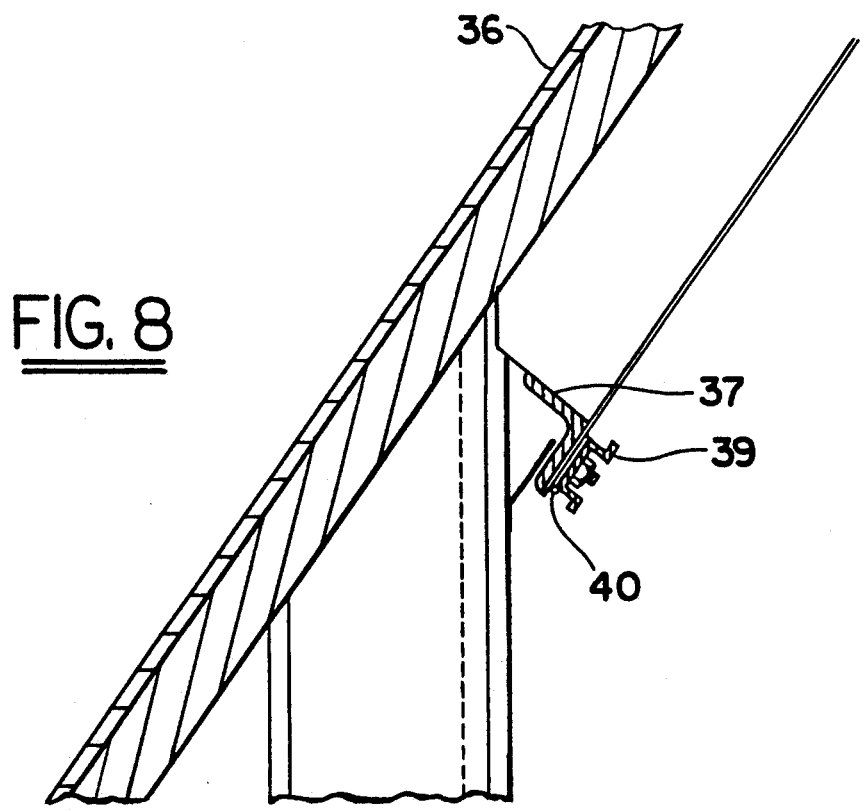
FIG. 8 is a detail in cross section of the bottom closure clamp.

Similarly at the bottom, FIG. 8 shows angle collar bracket 37 fastened by standard construction means to tank surface 36 near its interface with the lower base collar. Again, the collar bracket has spaced studs for retention of bottom collar channel, and the channel in turn secures the stretched and tensioned edge welt and is tightened down. Flashing 38 is provided to further seal and secure the joint from the elements.

We claim:

1. an apparatus for cladding the exterior surface of a structure which is curved, wherein said apparatus is comprised of:
   (a) a tensioned cladding membrane, wherein said tensioned cladding membrane has a proximal end, a distal end, and an intermediate portion disposed between said proximal end and said distal end;
   (b) a standoff member which is contiguous with said intermediate portion of said tensioned cladding membrane but is not attached to said tensioned cladding membrane;
   (c) a first tensioned cladding membrane attachment member which is contiguous with and attached to said proximal end of said tensioned cladding membrane;
   (d) a second tensioned cladding membrane attachment member which is contiguous with and attached to said distal end of said tensioned cladding membrane, wherein:
   1. said standoff member is disposed between said first tensioned cladding membrane attachment member and said second tensioned cladding membrane attachment member;
   2. said tensioned cladding membrane is disposed between said first tensioned cladding membrane attachment member and said second tensioned cladding membrane attachment member, said tensioned cladding membrane is attached to said first tensioned cladding membrane attachment member at said proximal end of said membrane, said tensioned cladding membrane is contiguous with said standoff member at said intermediate portion of said membrane, and said tensioned cladding membrane is attached to said second tensioned cladding membrane attachment means at said distal end of said membrane,
   3. from the proximal end to said standoff member, said tensioned cladding membrane forms an arc with a substantially continuous concave curvature, and
   4. from the distal end to said standoff member, said tensioned cladding membrane forms an arc with a substantially continuous concave curvature.

2. The apparatus as recited in claim 1, wherein said standoff member is a standoff rib.

3. The apparatus as recited in claim 1, wherein said tensioned cladding membrane is comprised of a fabric substrate.

4. The apparatus as recited in claim 3, wherein said fabric substrate consists essentially of fiberglass fabric.

5. The apparatus as recited in claim 4, wherein said fiber-glass fabric substrate is coated with a fluorocarbon polymeric material.

6. The apparatus as recited in claim 5, wherein said fiber-glass fabric substrate is coated with poly(tetrafluoroethylene).

7. The apparatus as recited in claim 1, wherein each of said first tensioned cladding membrane attachment member and said second tensioned cladding membrane attachment member is comprised of a clamping rib.

8. The apparatus as recited in claim 7, wherein each of said first tensioned cladding membrane attachment member and said second tensioned cladding membrane attachment member is comprised of a clamping rib assembly mounted to said clamping rib.

9. The apparatus as recited in claim 8, wherein said clamping rib assembly is comprised of a clamping plate and a clamping channel.

* * * * *